J. W. PRICE.
HUB BALL BEARING.
APPLICATION FILED APR. 15, 1909. RENEWED FEB. 27, 1911.
1,071,086.
Patented Aug. 26, 1913.
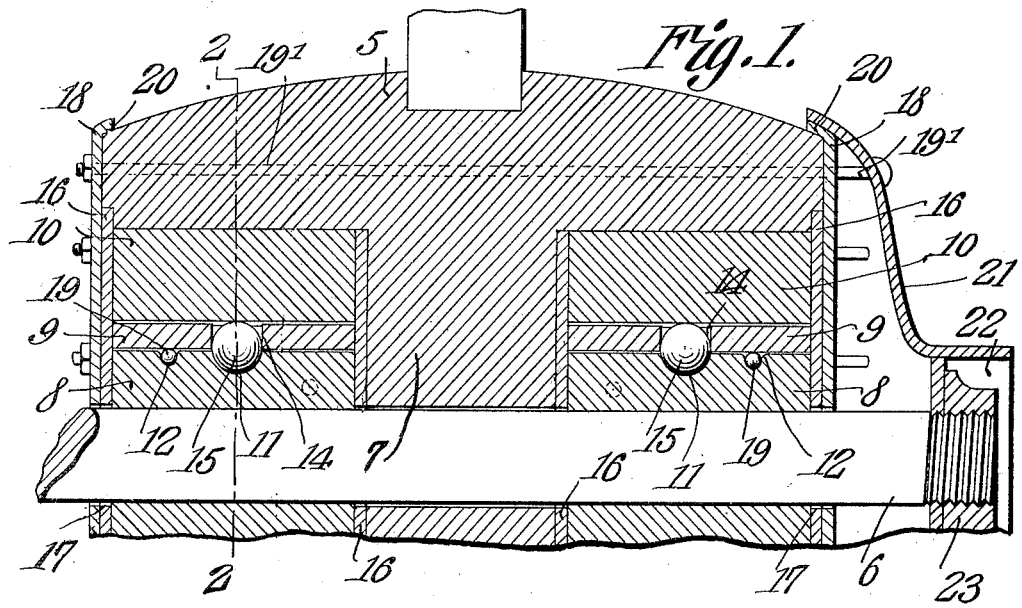
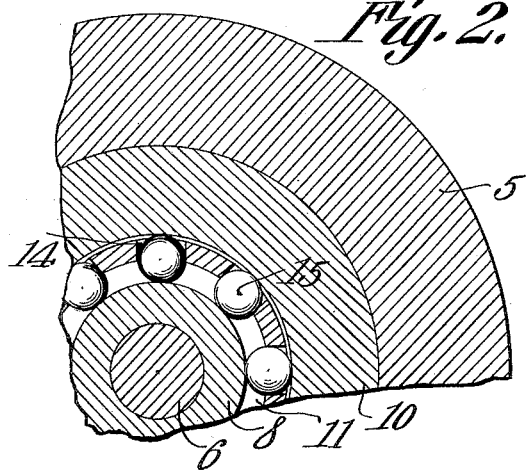
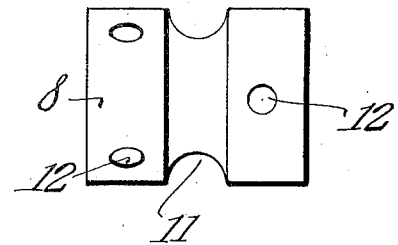
Witnesses
Inventor
John W. Price.
By C. A. Snow & Co.
Attorneys

UNITED STATES PATENT OFFICE.

JOHN W. PRICE, OF PITTSBURG, TEXAS.

HUB BALL-BEARING.

1,071,086.  Specification of Letters Patent.  Patented Aug. 26, 1913.

Application filed April 15, 1909, Serial No. 490,055. Renewed February 27, 1911. Serial No. 611,239.

*To all whom it may concern:*

Be it known that I, JOHN W. PRICE, a citizen of the United States, residing at Pittsburg, in the county of Camp and State of Texas, have invented a new and useful Hub Ball-Bearing, of which the following is a specification.

It is the object of the present invention to provide an improved construction of bearing intended chiefly to be employed between a wheel and an axle upon which it is mounted, and it is the aim of the invention to provide a bearing of this class in which friction will be reduced to a minimum and in which side thrust of the bearing members is prevented through the medium of ball or similar bearings whereby friction will be further reduced.

Broadly speaking, the bearing embodying the present invention comprises outer and inner bearing members which are relatively rotatable, an intermediate bearing member which is formed with openings receiving bearing balls which travel in a ball race formed in one of the first mentioned bearing members, and bearing balls which are interposed between the inner one of the bearing members and the intermediate bearing member, friction between all of the three members being in this manner reduced to a minimum.

In the accompanying drawings, Figure 1 is a vertical sectional view taken axially through a vehicle wheel hub showing the application of the bearing embodying the invention, therein. Fig. 2 is a vertical sectional view on the line 2—2 of Fig. 1 looking in the direction indicated by the arrow in the said figure. Fig. 3 is a detail view in elevation of the inner bearing member.

In the drawings, there is shown a vehicle wheel hub 5 and a vehicle axle spindle 6, the hub being mounted for rotation upon the spindle through the medium of the bearing embodied in the present invention. To this end, the hub 5 is formed in each end with a recess or seat and in each recess there is received one of the bearings, the intermediate portion of the hub or in other words that portion lying between the seats being indicated at 7.

Each of the bearings is comprised of an inner member 8, an intermediate member 9, and an outer member 10, the inner member being formed, at a point midway of its ends and circumferentially, with a ball or similar bearing race 11 and in its circumferential surface to each side of this race with a plurality of ball or other bearing receiving sockets 12, such sockets being shown in the drawings as adapted to receive bearing balls 19. As illustrated, this inner bearing member 8 is cylindrical in form and fitted thereover is the intermediate bearing member 9 which in reality serves as a bearing retaining member as will be presently explained. This member 9 is formed, midway of its ends, and circumferentially, with a plurality of openings 14 in each of which is disposed a bearing ball 15 which seats in the ball race 11 in the member 8, it being understood that these bearing balls 15 are, through the instrumentality of the said member 9, held in proper spaced relation at all times and that by reason of the reception of these bearing balls in the race 11, the member 9 is held from longitudinal displacement with respect to the member 8. The member 10, is also cylindrical and is fitted over the intermediate member 9 and has its inner circumferential surface unbroken but engaged by the bearing balls 15 whereby friction between the members 9 and 10 will be obviated.

It will be understood of course that the bearing member 8 is to be secured upon the axle spindle 6, although, under some conditions, it may be so fitted upon the spindle as to permit of rotation, and that the bearing member 10 is to be connected in some suitable manner with the hub 5 for rotation therewith, the intermediate member 9 rotating freely between the two members 8 and 10 and entirely independently thereof. The ball receiving sockets 12 in the bearing member 8, at each side of the bearing race 11, are alternated and by reason of this arrangement, a more firm bearing is secured between the said inner member and the intermediate member 9.

As heretofore stated, the hub 5 receives in each end one of the bearings embodying the invention and secured upon the member 10 of each bearing in each end thereof is a plate 16 formed axially with an opening 17 for the passage of the vehicle axle spindle 6. These plates 16 serve, in addition to the bearing 15, in preventing side thrust or longitudinal displacement of the bearing members one with respect to the other. There is also disposed against the outer end of each bearing or in other words against the plate 16 which is carried at the outer end of the bearing, a plate 18 and through the plates 18 and the hub 5, there are passed securing rods 19′ which serve to hold the plates 18 firmly in position against the ends of the hub and against the plates 16 at the outer end of the bearings within the hub, the peripheral edges of the plates 18 being each bent inwardly as at 20 to engage with the circumferential surface of the hub at the ends thereof. In addition to passing through the hub 5 and the plates 18, the rods 19′ pass also through a cap 21 which is fitted upon the outer end of the hub and is formed with a nut receiving seat 22 in which is received the usual nut 23 threaded upon the outer end of the spindle 6.

It is to be understood of course that where the bearing is used in other relations it may be held in place by any suitable means so long as its structure is not altered to such degree as to depart from the spirit of the appended claims.

What is claimed is:

1. The combination with a spindle and a hub, of a bearing member 8, provided with a centrally located ball race 11 and adjacent the ends with a series of ball receiving sockets 12, the said sockets being arranged alternately, a second bearing member 10 seated within said hub, a cage 9 interposed between the two bearing members, relatively large balls 15 arranged in the race and held permanently spaced by the cage and engaging with the inner wall of the second bearing member to receive the pressure from the hub, relatively small balls 19 arranged in the sockets of the member 8 engaging the inner wall of the cage to maintain the cage spaced from the bearing member 8, the ends of the members 8, 9 and 10 lying in the same plane in order that the several members may be properly assembled and held in position.

2. The combination with a spindle and a hub, of a bearing member mounted on said spindle and provided upon its outer peripheral surface with a centrally positioned ball race and adjacent each end with a series of ball receiving sockets, the sockets of the two series being arranged alternately, a second bearing member seated in the said hub provided with unbroken surfaces, an integral cage interposed between the two bearing members, relatively large balls arranged in the race and held permanently spaced by the said cage and engaging with the inner wall of the second bearing member, relatively small balls arranged in the said sockets and engaging with the inner wall of the cage.

In testimony that I claim the foregoing as my own, I have hereto affixed my signature in the presence of two witnesses.

JOHN W. PRICE.

Witnesses:
J. D. EPWOOD,
T. J. BEARD.

---

Copies of this patent may be obtained for five cents each, by addressing the "Commissioner of Patents, Washington, D. C."